March 21, 1939.  C. A. JOHNSON  2,151,211
BRAKE CONTROL MECHANISM
Filed April 23, 1937
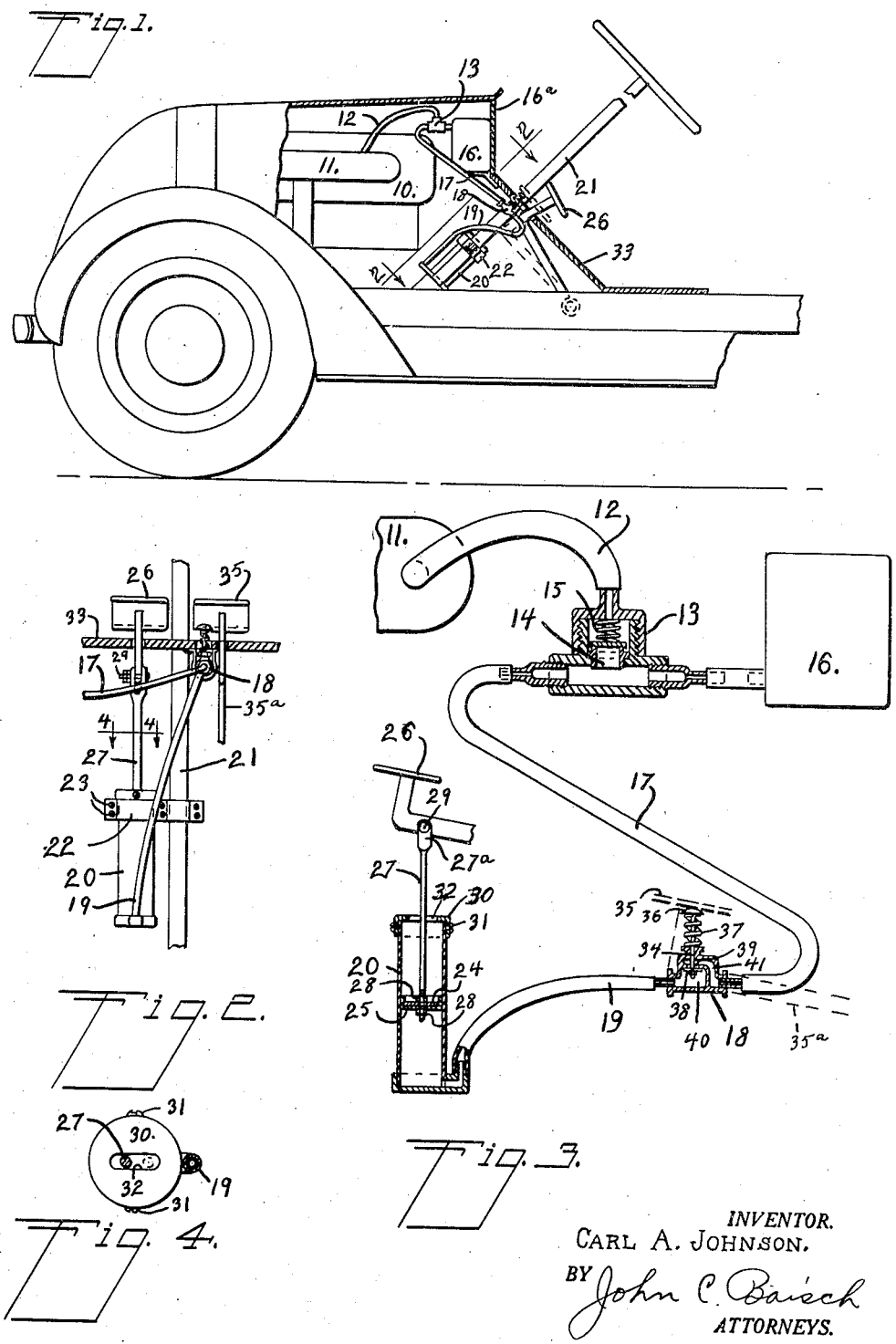
INVENTOR.
CARL A. JOHNSON.
BY John C. Baisch
ATTORNEYS.

Patented Mar. 21, 1939

2,151,211

UNITED STATES PATENT OFFICE 2,151,211

BRAKE CONTROL MECHANISM

Carl A. Johnson, Omaha, Nebr.

Application April 23, 1937, Serial No. 138,618

3 Claims. (Cl. 192—13)

My invention relates to brakes for motor vehicles and more particularly to means for controllably holding the brakes in desired applied positions.

It is an important object of my invention to provide mechanism of this character operable by vacuum.

It is another object of my invention to provide mechanism of this character controlled by the clutch pedal of the motor vehicle.

Another object of the invention is to provide a mechanism of this character that will hold the brakes in applied positions to prevent the motor vehicle from moving in either direction on hills without keeping the brake pedal depressed with the operating foot.

Another object is to provide mechanism of this character that will not interfere with the normal operation of the motor vehicle.

Another object is to provide mechanism of this character that will not interfere with the normal braking of the car when the clutch is disengaged and the clutch pedal is partly depressed.

Another object is to provide mechanism of this character that will hold the brake in applied position and leave the brake operating foot free to operate the accelerator.

Another object is to provide mechanism of this character adapted to control the return of the brake pedal from applied positions to the normal position in a smooth even manner.

Still another object is to provide mechanism of this character that is simple in construction and operation, easy and simple to install, and inexpensive to manufacture.

Other objects and advantages of the invention will become more readily apparent as the nature of the invention is better understood, the same consisting in the novel construction, combination and arrangement of the parts, as illustrated in the accompanying drawing which shows a preferred embodiment thereof.

Referring to the drawing:

Figure 1 is a side view of the front portion of an automobile with portions of same broken away to show the installation of my invention.

Figure 2 is a sectional view taken on line 2—2 of Figure 1 showing a front elevation of the control cylinder and control valve.

Figure 3 is a diagrammatic view of my invention.

Figure 4 is a partial section taken on line 4—4 of Figure 2 showing the upper end of the control cylinder.

Referring more particularly to the drawing, which illustrates a preferred embodiment of my invention, reference numeral 10 indicates the engine of a motor vehicle. The source of power employed for actuating the control mechanism is derived from the vacuum created by the engine in intake manifold 11. The suction or vacuum pull from the manifold operates through a tube 12, one end of which is suitably attached to the manifold and communicates with the interior thereof. The other end of tube 12 is attached to the normal outlet of a check valve 13 having a valve 14 which permits air to be drawn through same in one direction but prevents air from returning through same from said normal outlet. An expansion spring 15 holds the valve 14 in its normal closed position but permits same to open by a vacuum pull from the manifold 11. When the motor is running air is drawn from tube 12 and tube 17 which has one end operatively connected to the inlet of check valve 13 and the other end operatively connected to control valve 18. A vacuum tank 16 is operatively connected with the check valve 13, oppositely of the intake thereof, and a vacuum is created therein when the motor is running, said vacuum tank providing a reserve of operating power for the operating cylinder should the motor stall when the device is in operation. The vacuum tank is attached to the dash 16a by any suitable means although it may be attached to any other convenient part of the car.

A tube 19 operably connects the control valve 18 with operating cylinder 20, the latter being preferably secured to the steering column or post 21 of the automobile by a clamp 22 having clamping bolts 23.

A control piston or plunger 24, operable in cylinder 20 by vacuum, is provided with a seal 25, preferably of leather or other suitable material. The marginal edges of the seal are turned upwardly relative to the cylinder so that a vacuum pull in the lower end of the cylinder will hold the piston in desired positions and will permit the piston to be moved downwardly without resistance during normal braking of the car.

The piston is operably connected to the brake pedal 26 by a rod 27, the rod being secured to the piston by nuts 28 threadably received thereon. The opposite end of the rod 27 is forked with the fork members 27a straddling the brake pedal. A pin 29 is provided adjacent the free end of the brake pedal to which the forked members 27a are operably secured, said forked members being adapted for limited swinging movement on said pin 29 when the brake pedal is actuated.

The upper end of the cylinder 20 is provided with a cap 30 secured thereon by set screws 31, said cap having a slot 32 in substantially the same plane as the plane of the operative movements of the brake pedal. The rod 27 is operatively received in the slot 32 and is free to swing in said slot with the movements of said brake pedal. The connection of the rod 27 to the piston 24 is a rigid one which causes the piston to tilt into and out of a plane at right angles to the cylinder axis upon operable movements of the brake pedal.

Air control valve 18 is secured to the floor boards 33 with valve stem 34 projecting upwardly of the floor boards beneath the foot bracket 35 of clutch pedal 35a. The valve stem 34 is provided with a button 36 adjacent its free end against the under side of which is received one end of expansion spring 37, the other end of said spring being received against the housing of the valve 18, said spring being adapted to normally hold valve member 38 of the valve 18 in its closed position wherein air opening 39 is closed against the passage of air between chambers 40 and 41 of the valve.

Normal brake operation obtains at all times that the clutch pedal is not fully depressed. At such times the clutch pedal may be in its normal position with the clutch engaged or the clutch pedal may be partially depressed with the clutch out of engagement.

When it is desired to apply the foot brake under such conditions the said foot brake pedal 26 may be depressed without resistance of air in the cylinder 20 due to the arrangement of the seal 25 of the piston. The brake pedal will return to its normal position with a smooth action as the air in the cylinder allows such action. The return of the brake pedal to its normal position is slow enough to provide smooth action and yet fast enough to provide quick release of the brakes.

When it is desired to hold the automobile on a hill to prevent same from rolling backward or forward, the clutch pedal is fully depressed to open the air valve 18, the valve stem 34 of said valve being actuated by bracket 35 of the clutch pedal. A vacuum pull is thereby created in the lower end of cylinder 20.

The vacuum pull thereby created is insufficient to cause braking of the automobile but will take up the slack in the brake pedal. When the brake pedal 26 is then depressed by pressure of the foot of the driver to the desired applied position the vacuum pull on piston 24 is sufficient to hold the pedal in said applied position thereby holding the vehicle stationary as long as air valve 18 is open. The foot used in braking the vehicle is then free to operate the foot accelerator and the driver is ready to start the machine. The motor may be speeded up and the clutch pedal allowed to raise until the clutch is engaged. The brake pedal will immediately begin to return to its normal position as soon as the valve 18 is closed. The vacuum in the cylinder 20 appears to be broken by the tilting of the piston 24 out of a plane at right angles to the cylinder axis thus allowing air to re-enter the cylinder past the piston.

This invention is particularly valuable where it is necessary to stop on a hill as when a traffic light at an inclined street intersection calls for a stop.

It should also be noted that when vacuum power is being exerted in the cylinder said power aids in applying the foot brake, although as heretofore stated, it is insufficient per se to apply the brakes.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention, what I claim is:

1. In an automotive vehicle, the combination of a brake and clutch pedal with vacuum actuated means for holding the brake in applied positions, said means comprising an operating cylinder, a piston in said cylinder adapted to be retained in operative positions by vacuum, a rod rigidly connected with the piston and operably connected with the brake pedal, an air control valve adapted to be actuated by the clutch pedal when same is fully depressed, means operably connecting the operating cylinder with the control valve, a check valve having an inlet and an outlet, means operably connecting the control valve with the inlet of the check valve, means operably connecting the outlet of the check valve with a source of operating vacuum, and means for providing a reserve vacuum supply for the operating cylinder upon deficiency of the vacuum source, said last mentioned means being operably positioned between the check valve and the control valve, the piston in the operating cylinder being adapted to be tilted, by operative movement of the connecting rod, into and out of a plane at right angles to the cylinder axis.

2. In an automotive vehicle, the combination of a brake and clutch pedal with vacuum actuated means for holding the brake in applied positions, said means comprising an operating cylinder, a piston in said cylinder adapted to be retained in operative positions by vacuum, a connecting rod rigidly connected with the piston and operably connected with the brake pedal, said piston being adapted to be tilted into and out of a plane at right angles to the cylinder axis upon operative movements of the brake pedal and connecting rod, an air control valve adapted to be actuated by the clutch pedal when same is fully depressed, means operably connecting the operating cylinder with the control valve, a check valve having an inlet and an outlet, means operably connecting the control valve with the inlet of the check valve, and means operably connecting the outlet of the check valve with a source of operating vacuum.

3. In an automotive vehicle, the combination of a brake and clutch pedal with vacuum actuated means for holding the brake in applied positions, said means comprising an operating cylinder, a piston in said cylinder adapted to be retained in operative positions by vacuum, a connecting rod rigidly connected with the piston and operably connected with the brake pedal, said piston being adapted to be tilted into and out of a plane at right angles to the cylinder axis upon operative movements of the brake pedal and connecting rod, an air control valve adapted to be actuated by the clutch pedal when same is fully depressed, means operably connecting the operating cylinder with the control valve, and means operably connecting the control valve with a source of operating vacuum.

CARL A. JOHNSON.